(12) United States Patent
  Dent (10) Patent No.: US 10,944,263 B2
(45) Date of Patent: Mar. 9, 2021

(54) NEUTRAL ROUTING FOR MULTIPLE ELECTRICAL POWER SOURCES

(71) Applicant: Koolbridge Solar, Inc., Wrightsville Beach, NC (US)

(72) Inventor: Paul Wilkinson Dent, Pittsboro, NC (US)

(73) Assignee: Koolbridge Solar, Inc., Wrightsville Beach, NC (US)

( * ) Notice: Subject to any disclaimer, the term of this patent is extended or adjusted under 35 U.S.C. 154(b) by 0 days.

(21) Appl. No.: 16/464,911

(22) PCT Filed: Nov. 29, 2017

(86) PCT No.: PCT/US2017/063715
  § 371 (c)(1),
  (2) Date: May 29, 2019

(87) PCT Pub. No.: WO2018/102415
  PCT Pub. Date: Jun. 7, 2018

(65) Prior Publication Data
  US 2020/0014205 A1  Jan. 9, 2020

Related U.S. Application Data

(60) Provisional application No. 62/427,823, filed on Nov. 30, 2016.

(51) Int. Cl.
  *H02J 3/00*  (2006.01)
  *H02G 3/04*  (2006.01)
  *H02G 3/08*  (2006.01)
  *H02J 7/35*  (2006.01)

(52) U.S. Cl.
  CPC .......... *H02J 3/005* (2013.01); *H02G 3/0437* (2013.01); *H02G 3/083* (2013.01); *H02J 7/35* (2013.01)

(58) Field of Classification Search
  CPC ...... H02J 3/005; H02J 7/35; H02J 9/00; H02J 9/04; H02J 9/06; H02G 3/0437; H02G 3/083
  See application file for complete search history.

(56) References Cited

U.S. PATENT DOCUMENTS

| | | |
|---|---|---|
| 5,166,861 A | 11/1992 | Krom |
| 7,692,332 B2 | 4/2010 | Nordman et al. |
| 8,937,822 B2 | 1/2015 | Dent |
| 9,035,782 B1 * | 5/2015 | Flegel ................ H02H 3/165 307/64 |
| 9,281,715 B2 | 3/2016 | Lim et al. |
| 9,509,139 B1 * | 11/2016 | Flegel ................ H02J 9/066 |
| 2013/0070394 A1 | 3/2013 | Batzler et al. |

* cited by examiner

*Primary Examiner* — Carlos Amaya
(74) *Attorney, Agent, or Firm* — Coats & Bennett, PLLC (57) ABSTRACT

In an electrical distribution system for a facility served by two power sources, ground currents on neutral conductors are avoided by utilizing a common neutral conductor in distributing power from both power sources to one or more transfer switches. In at least one single cable or conduit run, either between transfer switches or between both power sources and a transfer switch, line conductors carry power from each power source to the transfer switch(es), and a common neutral conductor carries return current for both power sources. The neutral terminals of both power sources are connected together (in part via the common neutral conductor in the single cable or conduit run), and the common neutral is grounded at only one place.

24 Claims, 8 Drawing Sheets

NEUTRAL ROUTING FOR MULTIPLE ELECTRICAL POWER SOURCES

RELATED APPLICATIONS

This application claims priority to U.S. Provisional Patent Application Ser. No. 62/427,823, filed 30 Nov. 2016, by the present inventor Dent, titled "Neutral Routing for Communal Inverter System," the disclosure of which is incorporated herein by reference in its entirety.

TECHNICAL FIELD

The present invention relates generally to electrical power distribution, and in particular to systems and method of routing neutral wires in facilities where power is distributed from two or more sources.

BACKGROUND

In electrical installations served by an electric utility, power enters the installation at a service entrance into a main service panel. In U.S. residential installations, power entering the main service panel comprises two 120-volt antiphase 60 Hz feeds, designated L1 and L2, plus a common neutral, N. In commercial installations, a 3-phase service is often supplied, comprising L1, L2, L3 and N. In other places in the world, a single-phase residential system may comprise only one 240 volt, 50 Hz feed L, plus N.

The neutral is bonded to the local grounding system in the service entrance panel and may not be connected to ground anywhere else. The reason for the latter prohibition is that such a second connection from neutral to ground at another place would cause a parallel path for the neutral current to flow along grounding wires, with unpredictable consequences. In general, it is necessaary to ensure that currents flowing in any of the L1, L2, or L3 wires in a cable or conduit totals vectorially to exactly the same current flowing backwards on the neutral wire in the same cable or conduit. If the neutral return current flows in a neutral wire that is physically separated from the L1, L2, or L3 conductors, the current loop so created has a large area and thus radiates a strong magnetic field at the power line frequency, which can heat objects in the field and cause power losses and execessive hum in audio systems and telephones. The above rules for a correct installation are collected in the National Electrical Code (NEC).

One instance where the above rules must be carefully considered is when appliances, circuits, or loads in an installation are to be supplied sometimes from one source, such as utility power, and sometimes from an alternate source, such as a generator, a solar inverter, or a battery back-up (UPS) system. In paragraph 250.30, the NEC defines "Separately Derived Systems" and "Non-Separately Derived Syatems." A separately derived system has its own neutral bonded to ground at a different location than where the utility neutral is bonded to ground. Therefore, if the neutrals of the separately derived system and the utility were connected at any point, a parallel path would be created for neutral currents to flow through grounding wires, which is to be prevented. NEC exhibit 250.13 illustrates that the method to avoid such undesirable ground currents is to switch both the line and neutral wires of a load from one source to another, to avoid joining both to the load neutral and thus to each other. Thus for a residential split-phase service, a 3-pole transfer switch is required to transfer L1, L2, and N between the two alternate power sources, and for a 3-phase system, a 4-pole transfer switch is required.

On the other hand, the NEC defines a "non-separately derived system" as one in which its neutral is not grounded at a second location different than the location where the utility neutral is grounded. Thus, the non-separately derived system is an ungrounded power source until its neutral is permanently connected to the utility neutral within the transfer switch. The non-separately derived system therefore obtains the grounding of its neutral through the utility neutral all the way back to the utility service entrance and to the same, single grounding system.

A problem arises when a non-separately derived system may be called upon to supply power to two different groups of loads connected to physically separate transfer switches. The question is then where its neutral can be connected to the utility neutral without forming parallel neutral paths. A similar problem arises in battery back-up inverter systems where the inverter may have a first connection to the utility for battery charging but also supplies a neutral connection through one or more transfer switches to loads. Thus a wiring method is required that avoids violating the NEC as well as avoiding creating current loops of large area that would radiate a magnetic field.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments of the present invention disclosed and claimed herein, ground currents on neutral conductors are avoided by utilizing a common neutral conductor in distributing power from two power sources to one or more transfer switches. In at least one single cable or conduit run, either between transfer switches or between both power sources and a transfer switch, line conductors carry power from each power source to the transfer switch(es), and a common neutral conductor carries return current for both power sources. The neutral terminals of both power sources are connected together (in part via the single cable or conduit run), and the common neutral is grounded at only one place.

A first exemplary application of the inventive wiring arrangement is for connecting an inverter-charger to a first electrical power source such as the elecric utility grid for charging a battery, the charged battery then powering the inverter at a later time or at the same time as charging to generate an alternative power source. The alternative power source is selecteable by a transfer switch that selects either utility power or inverter power to power a load. A problem in the prior art occurred when the utility neutral connected to the inverter charging input and carried through to the inverter neutral output connected to the transfer switch. At the same time a second neutral connected from the first power source to the transfer switch. If the transfer switch did not select between the neutrals arriving from the first power source and the inverter, but rather connected both neutrals to the load and therefore to each other, an impermissible neutral loop was created. According to one embodiment of the present invention, a common multi-conductor cable comprising the hotlegs for carrying both charging power to the inverter charger as well as carryting utility power to the transfer switch, comprises a common neutral that is used for the return current in both cases.

A second exemplary wiring arrangement according to embodiments of the invention is used to connect a first power source, such as the electrical utility, and a second power source, such a DC to AC inverter, to more than one transfer switch. The switches independently select either the first or the second power source to power their associated loads, but do not select between respective neutrals. The neutrals from the two sources are connected together and supply a neutral connection to each load, thereby potentially giving rise to the same problem as in the first exemplatry application. One or more embodiments employ a first power distribution panel containing first breakers that distribute power from the line terminals of the first power source to each of the transfer switches, and a second panel containing second breakers that distribute power from the line termianls of the second power source. All of the line current carrying conductors are run in the same mutliconductior cable or conduit with a common neutral that connects the neutral of both sources and supplies the neutral connection for the loads of each transfer switch.

One embodiment relates to an electrical power distribution wiring arrangement for a facility. A first power source distribution panel comprises at least one line terminal and at least one neutral terminal connectable to a first power source and at least one output line terminal and an output neutral terminal. The panel connects the neutral terminals to a ground bus connected to a grounding system at or near the first power source distribution panel. A second, non-separately derived system power source is operative to output electrical power on at least one line terminal and a neutral terminal. A first transfer switch, having a single neutral connection, is operative to select the first power source or the second power source to power one or more electrical loads. A first cable or conduit run is connected to the transfer switch. The first cable or conduit run contains a first set of at least one line conductors operative to carry load current from the first power source to the load; a second set of at least one line conductors operative to carry load current from the second power source to the load; and a common neutral conductor operative to carry return current from either the first or second set of line conductors. The neutral terminal of the second power source is connected to the neutral terminal of the first power source distribution panel, in part via the common neutral conductor of the first cable or conduit run, and hence to the grounding system at or near the first power source distribution panel.

Another embodiment relates to a method of wiring a facility for the distribution of electric power from two power sources to one or more transfer switches. The transfer switches are operative to individually select power for connected loads from either power source, in a manner that avoids ground currents in neutral wiring conductors. Line conductors carrying power from each power source, and a common neutral conductor, are connected to each transfer switch. Line conductors carrying power from each power source and a common neutral conductor are routed, between transfer switches or from both power sources to a transfer switch, in a first single cable or conduit run. The neutral terminals of the two power sources are connected together. The common power supply neutral conductor is connected to ground at only one point.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
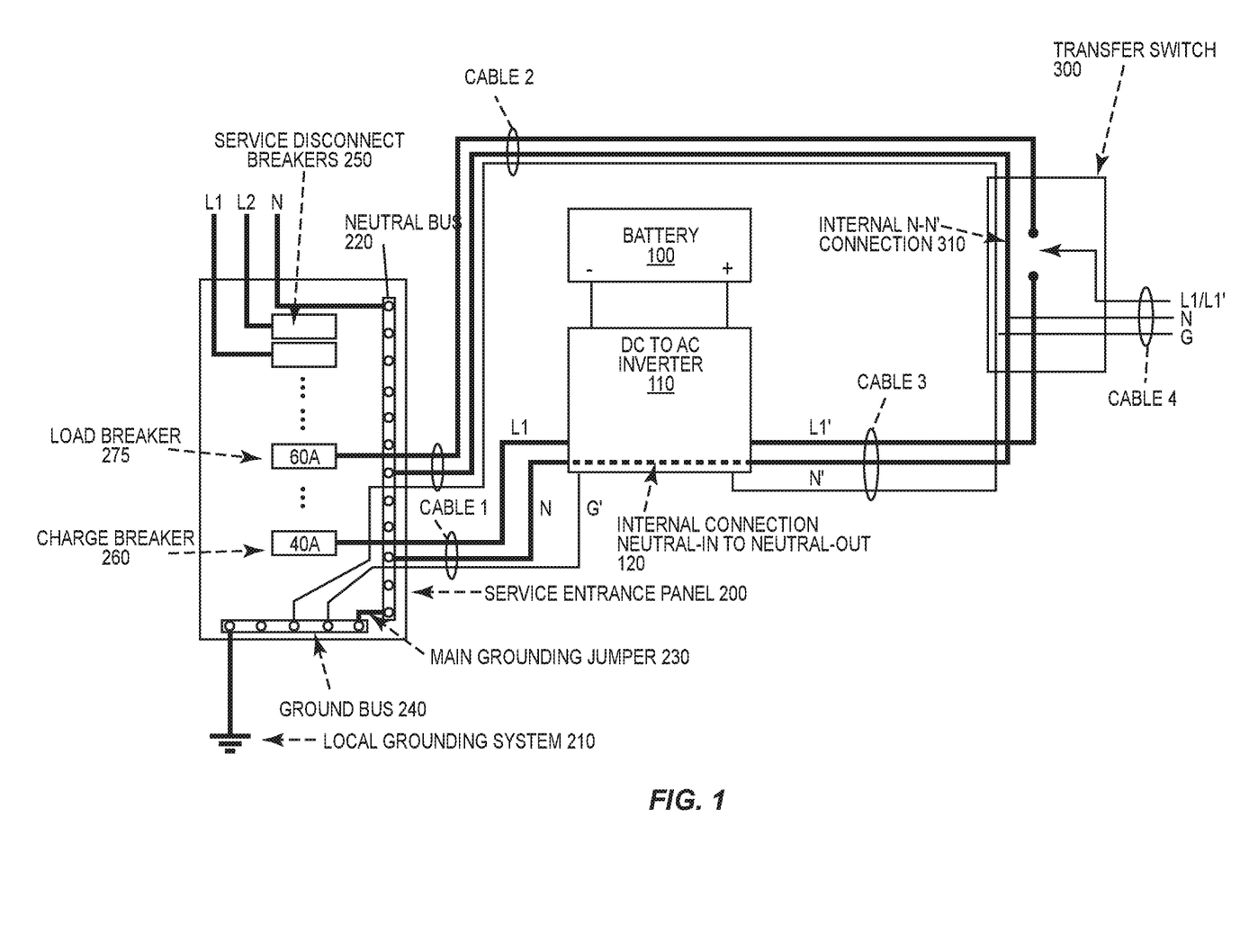
FIG. 1 shows a neutral routing violation of a first type.

FIG. 1 shows a first type of violation of neutral routing principles in a system that comprises a transfer switch (300) to alternately select utility power or power from a battery-driven inverter (110) to power loads.

Utility power enters an exemplary residential installation via service entrance panel (200) and comprises two anti-phase hotlegs L1 and L2, plus neutral N. L1 and L2 go through service disconnect breakers (i.e., a 2-pole breaker) (250) which would typically be 200 amp.

The neutral N connects to a neutral buss (220) from where it can be picked up for onward connection to loads, outlet circuits, or appliances.

A local grounding system (210), such as a ground rod, is connected to ground buss (240) from where ground wires may be run to appliances or outlet circuits. Moreover, the neutral buss is firmly strapped to the ground buss by main grounding jumper (230), which is the only connection permitted in the entire system from any neutral wire to any source of ground, so as to avoid creating a parallel path through grounding wires for neutral (return) current to flow.

A DC to AC inverter (110) is powered by a battery (100) to supply an alternative source of power to utility grid power, for example, during a utility outage. In that case, the battery may be kept charged from utility power when available through cable 1, which feeds utility power from charger breaker (260) to the inverter/battery combination. The fully charged battery is then available to bridge utility outages.

Many different arrangements could be envisaged for batteries connected to chargers and inverters, but a very common arrangement is for the inverter to be used in reverse to convert AC to DC for charging the battery. Two advantages of such an arrangement are lower cost through using the same device as a charger and an inverter, and the technical advantage that the current draw from the utility can be arranged to be a sine wave which is at least preferred if not mandated by the utility when the power draw is high. Alternative methods of converting AC to DC, such as half wave or full wave rectifiers, take current pulses from the utility. The current pulses are rich in harmonics that can cause additional transmission losses when the current pulses are of high amplitude.

When the inverter (110) is used in reverse as a charger, it means that at least the output neutral is connected to the utility neutral, and thus the inverter is, at that point, considered to be a non-separately derived system. One such inverter is the Xantrex SW4048, available from Trace Engineering of Arlington, Wash. The internal connection between the input neutral and the output neutral is shown as dashed line (120).

Being a non-separately derived system, inverter power may be selected instead of the utility grid to power loads by a transfer switch (300) that switches only the L1 wire and not the neutral wire. In fact, even a momentary disconnection of the neutral wire can be hazardous in a residential installation, as there were cases in the past where a load, such as a tumble drier, was permitted to use the neutral as its groundng wire to save money. This was reasonable on the assumption that neutral was always permanently connected to ground; however more recently it has been realized that circumstances where the neutral wire becomes disconnected cause a severe electrocution hazard in laundry rooms. Accordingly, this practice of using the neutral as a ground was outlawed for new installations. Nevertheless, there are older installations that still maintain that practice, and which are not required to be upgraded to the current Code.

Transfer switch (300) thus has an input for utility power via cable 2, comprising an L1 hotleg from 60 amp load breaker (275) in service entrance panel (200), together with a neutral wire and ground wire. Transfer switch (300) also has an input for inverter power via cable 3, comprising the inverter-derived hotleg L1 ', an accompanying neutral, and a ground wire.

The reason that there is a neutral accompanying L1 from load breaker (270) to the transfer switch is that the neutral return current is required to flow in the same cable or conduit as the line current, so that no large area magnetic loop is created. Likewise, the neutral N' accompanying the inverter hotleg L1' in cable 3 is to carry the inverter return current in N' in the same cable or conduit as the line current L1'. However, upon the neutrals from load breaker (270) and inverter (110) arriving at transfer switch (300), they are both joined to the same neutral feed to the load at the output of the transfer switch, and therefore to each other, as the transfer switch does not select between neutrals.

It may now be seen that this creates two parallel paths for the neutral current, one through cable 2 back to the neutral buss of service entrance panel (200), and another through cable 3 back to inverter (110) and through the internal input-to-output neutral connection (120) in the inverter and cable 1 to the same neutral buss in service entrance panel (200). This is a violation of electrical wiring principles that seek to avoid creating parallel paths in which the current can split in an undefined ratio. Thus inverter L1' current may be partially returned to the inverter by the extraneous path through cable 2, while utility L1 current could be partially returned through the cable 3 path through the inverter internal connection 120 to the same service entrance neutral buss. Either of these circumstances causes the return current to be partially flowing in a different cable or conduit than the line current. When a current flows in a conductor within a metallic conduit that is not balanced by equal and opposite currents flowing in other conductors in the same conduit, a section of steel conduit acts like a lossy magnetic toroidal core, causing voltage drop, power loss, and heating of the conduit, even at small currents such as 5 amps. Therefore it is impermissible to wire up a system as shown in FIG. 1.

Figure 3:
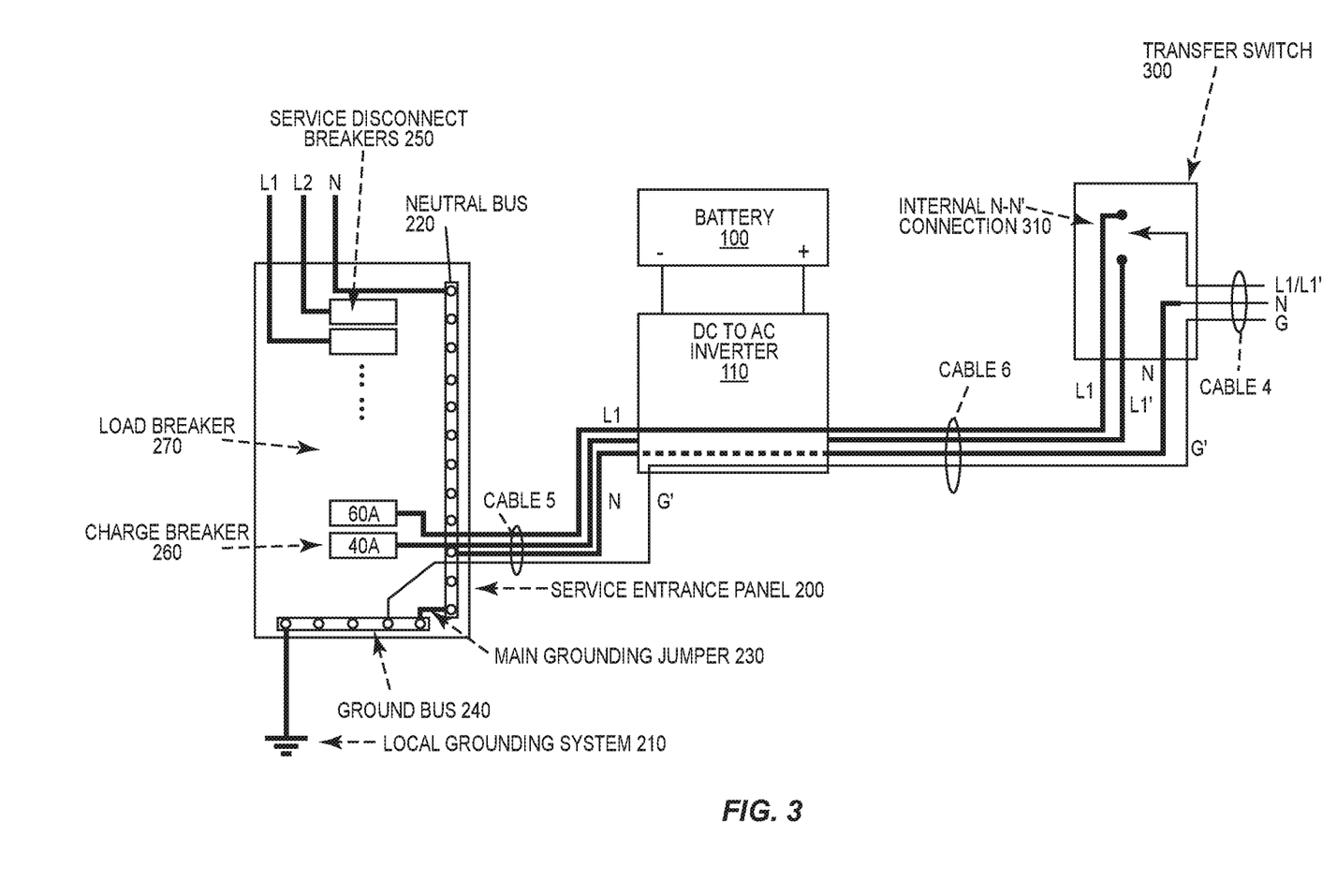
FIG. 3 shows a first neutral routing according to one embodiment of the invention.

FIG. 3 shows an neutral routing and wiring scheme, according to one embodiment of the present invention, that achieves the routing objectives in a permissible manner. Instead of separate cables (1 and 2) for carrying charging current to the inverter, and load current to the transfer switch, respectively, a single cable or conduit 5 carries charging current on one conductor, load current for transfer switch (300) on a second conductor, and has a shared neutral wire for both charging current and load current. The neutral wire must therefore be sized to carry the sum of the load and charging currents. These currents can be arranged to be opposite phases of the splitphase service by placing the load breaker (270) in a slot neighboirong the charging breaker (260). The sum of the charging and load currents is then less than either one alone, and no wire gauge increase is required. Alternatively, two neutral wires of the same gauge may be paralleled in the same conduit, assuming that there are two terminals in the inverter (110) to receive them. If the inverter (110) has a single terminal to receive one larger gauge wire, it must be rated for the sum of the charging and load currents.

The internal connection from inverter input neutral to output neutral carries now a single neutral to transfer switch (300). This will be the return path for either inverter L1' current or grid L1 current, according to which source transfer switch (300) selects. In addition, the utility L1 from load breaker (270) passes straight through inverter (110), along with the neutral N, through cable 6 to transfer switch (300). Both cable 5 and 6 thus contain two L1 current-carrying conductors, a shared neutral, and a ground. Standard cables exist that comprise two hotlegs, a neutral, and ground. The two hotlegs are normally envisaged for carrying L1 and L2 splitphase hotlegs. If, however, the inverter (110) provided two splitphase hotlegs L1' and L2' and the transfer switch (300) was a 2-pole transfer switch selecting between alternate sources of both hotlegs, cable 6 at least would need to have four hotlegs L1, L2, L1', and L2', as well as neutral and ground. In that case it may be necessary to use conduit containing the six wires if no suitable standard cable is readily available.

Likewise, cable 5 would require four hotlegs, neutral, and ground if the charger breaker (260) was a 2-pole breaker. This is indeed the case when two inverters of type Xantrex SW4048 are connected and synchronized in antiphase to provide both hotlegs of a splitphase system.

It may be seen in FIG. 3 that no loops have been created, as there is a single, straight wiring run from the service entrance panel (200) to the inverter (110) and a single, straight wiring run from the inverter (110) to the transfer switch (300). Thus, currents in all hotlegs of cable 5 plus the neutral current vector-sum to zero, as do the currents in cable 6, whether or not the inverter (110) is synchronized to the utility grid. Such a wiring scheme has not been disclosed in the prior art, as it comprises passing an additional L1 wire from load breaker (270) through the inverter (110) to transfer switch (300) without it having any functional connection to the inverter (110), which is not an obvious implementation. In fact, the exemplary Xantrex SW4048 inverter does not provide an indicated route for the extra L1 through-connection, and an ad-hoc routing would be required.

The inventive solution of FIG. 3 is shown with the utility connections provided by the main service entrance panel. However, the utility connections may alternatively be provided by locating breakers (260, 270) in a sub-panel. The solution of FIG. 3 is valid as long as breakers (260, 270) are contained in the same panel, to permit a common neutral wire in cable 5.

Figure 2:
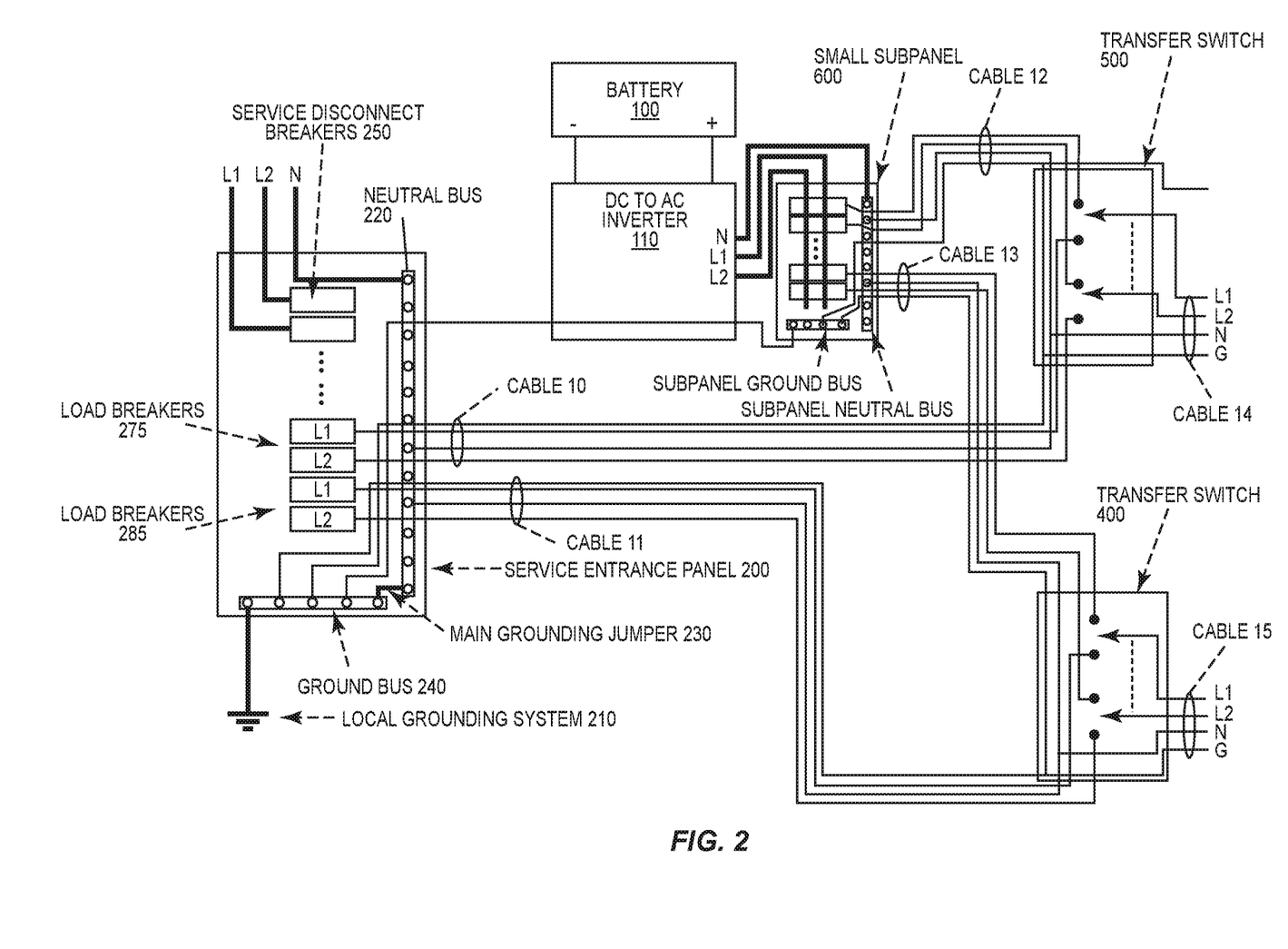
FIG. 2 shows a neutral routing violation of a second type.

FIG. 2 illustrates a second type of neutral routing violation. This type of violation occurs when a non-separately derived system, e.g., a DC to AC inverter (110), can be selected via two independent transfer switches (400, 500), located at different physical locations, to power either or both of two different loads or appliances, instead of utility grid power.

FIG. 1 illustrated a single-phase system in which only one hotleg, L1, was involved, but it was explained that a similar situation exists when both hotlegs of a split phase system are involved, and the corresponding inventive wiring solution of FIG. 3 can be used for single or split phase with approriate cables or conduit runs. In FIG. 2 a splitphase system is shown in which both L1 and L2 hotlegs are involved, but by omitting the L2 wires FIG. 2 is equally applicable to a single phase system, or by adding L3 wires, would be equally applicable to a 3-phase system.

In FIG. 2, two separate, 2-pole transfer switches (400, 500) can select either L1, L2 from utility, or L1, L2 from inverter (110), which now is assumed to generate both hotlegs of a splitphase supply. The utility L1, L2 which can be selected by transfer switch (500) come from a 2-pole load breaker (275) in service entrance panel (200) via cable 10, which also carries the utility neutral and a ground wire. The utility L1 and L2 which can be selected by transfer switch (400) come from 2-pole load breaker (285) via cable 11, which also carries a utility neutral and a ground wire. Cables 10 and 11 must carry the neutral so that when current is drawn from utility L1 and/or L2 then the net return current, which is the difference between the L1 and L2 currents, flows in a neutral wire in the same cable or conduit.

In the FIG. 2 case, inverter (110) is also selectable by transfer switches (400, 500). Therefore, some means of splitting the power between switch (400) and switch (500) is required. In principle, L1 and L2 could just split with T-junctions, but FIG. 2 shows a separate small subpanel which routes the power through separate breakers to the transfer switches (400, 500). If the inverter (110) were a very large communal inverter, such a subpanel would likely be necessary to protect the smaller wiring from each transfer switch (400, 500) to its load from the full available current of the large inverter (110).

Cable 12 carries inverter L1, L2 and inverter neutral and a ground wire to transfer switch (500) and cable 13 carries inverter L1, L2 and inverter neutral plus ground to transfer switch (400). Upon arriving at transfer switch (500) however, inverter neutral and utility neutral from cable 10 are both connected to the load neutral of cable 14, and therefore to each other, because the transfer switch selects only between hotlegs, and not between neutrals. As explained earlier, there are safety reasons not to select between neutrals in order to preserve the integrity of the grounding of neutral at all times. Likewise, upon cables 11 and 13 arriving at transfer switch (400), inverter neutral from cable 13 and utility neutral from cable 11 are both connected to the load neutral of cable 15, because transfer switch (400) does not select between neutrals.

If now the neutral wiring is traced, it will be seen that the neutral of cable 11 originating at neutral buss (220) of service panel (200) travels to transfer switch (400), passes through transfer switch (400) and through cable (13) to the inverter neutral buss of subpanel (600), and from there through cable 12 to transfer switch (500), through transfer (500) and cable 10 back to neutral buss (220) of service entrance panel (200), thus creating a large neutral loop in violation of wiring principles. Neutral return current can flow in either direction around this loop and is thus not guaranteed to match the L1-L2 currents in any cable or conduit, creating potential voltage loss, heating, and interference to audio systems via a strong radiated magnetic field.

It may also be noted that there is a ground loop created by the wiring of FIG. 2 tracing the same path as the neutral loop. Furthermore, the additional ground wire from the inverter (110) to the service entrance panel ground buss (240) creates additional ground loops. While ground loops are not as disastrous as neutral loops, the embodiment of the present invention depicted in FIG. 4 avoids both.

Figure 4:
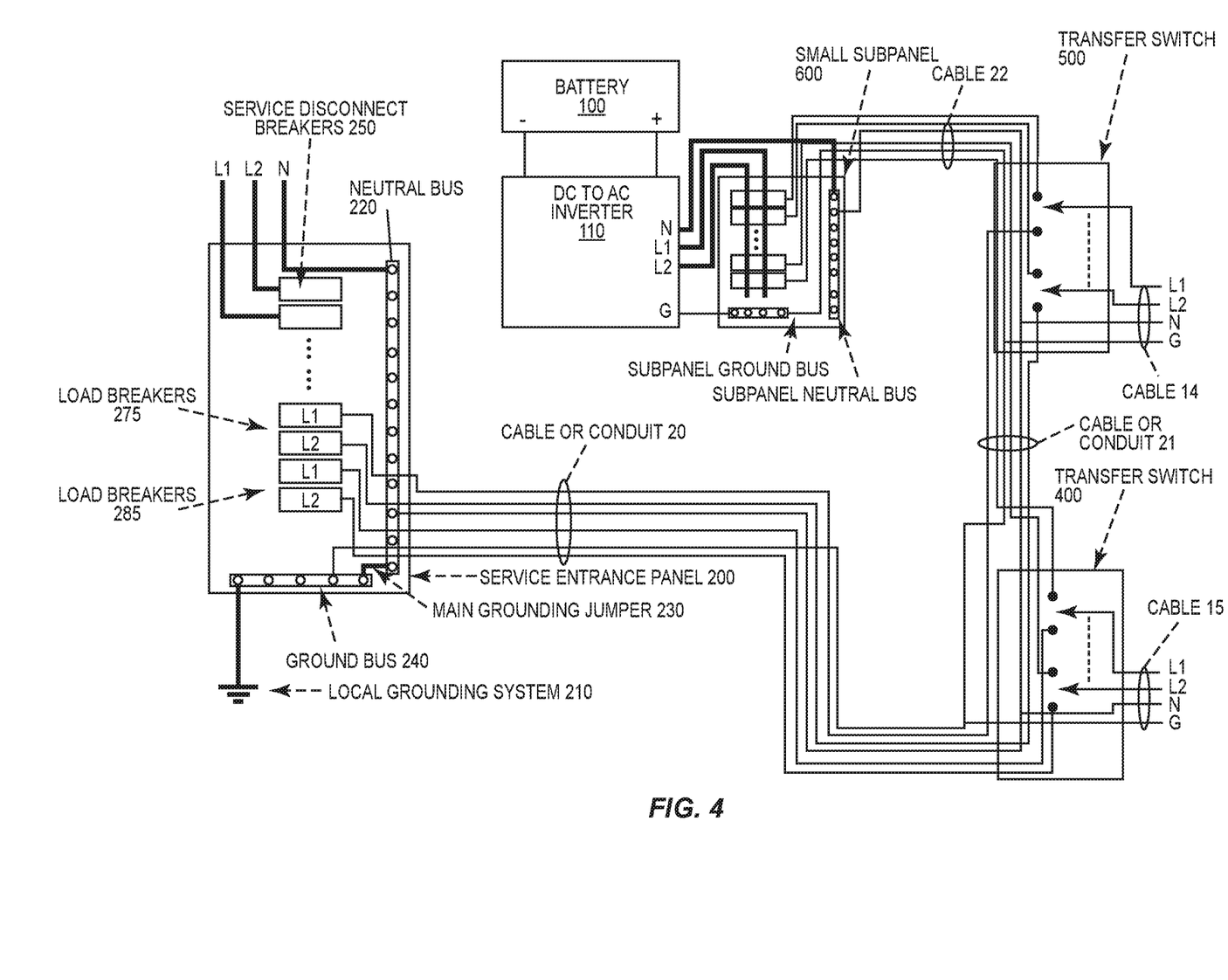
FIG. 4 shows a second neutral routing according to another embodiment of the invention.

The wiring depicted in FIG. 4 solves the neutral violation problem of FIG. 2 by use of a cable or conduit run comprising 2×L1 plus 2×L2 plus neutral plus ground, that runs from the service entrance panel (200) through transfer switch (400), to transfer switch (500), through transfer switch (500) to subpanel (600), and then to inverter (110). Furthermore, no wire takes other than this linear path. In cable or conduit 20, one L1 and one L2 conductor originate at 2-pole breaker (285) and terminate at transfer switch (400). The L1 and L2 conductors that are severed to terminate in transfer switch (400), however, are re-used in cable or conduit 21 to connect L1' and L2' from the inverter contacts of transfer switch (400) through transfer switch (500) and cable/conduit section 22 to a 2-pole breaker in subpanel (600). The other 2-pole breaker in subpanel (600) provides a second inverter L1' and L2' using the other pair of line conductors in cable/conduit section 22 to terminate at the inverter contacts of transfer switch (500). Then the severed conductors continue from the utility contacts of transfer switch (500) through cable/conduit section 21 and through transfer switch (400) and cable/conduit section 20 to 2-pole breaker (275) in service entrance panel (200).

The neutral wire is a essentially a continuous conductor from service entrance panel neutral buss (220) through cable/conduit section 20 to transfer switch (400), where it provides a neutral output on cable 15 to a first load. The neutral then continues through transfer switch (400) and cable/conduit section 21 to transfer switch (500), where it provides a neutral output to a second load on cable 14. It then continues through cable or conduit section 22 to subpanel (600), where it picks up the inverter neutral. Thus, the inverter neutral gets grounded via the utility neutral and main bonding/grounding jumper (230) to the one and only ground system (210), thereby satisfying the definition of inverter (110) to be a non-separately derived system.

In examining current flow in cable/conduit section 21 when transfer switch (500) is selecting utility power and transfer switch (400) is selecting inverter power, it is apparent that utility neutral current flows down cable section 21 from transfer switch (500) at the same time as inverter neutral current flows up from transfer switch (400). Without knowing whether the utility and inverter currents in question are in or out of phase, one must therefore assume that these neutral currents add. However, the utility neutral current to transfer switch (500) plus the inverter neutral current to transfer switch (400) is not greater than the sum of utility currents in cable section 20 when utility power is selected by both transfer switches. Therefore if the same cable is used for cable section 21, its ampacity will suffice for all conditions.

In all cases, the neutral and line currents in cable section 21, as in all other sections of the wiring, cancel exactly, thus avoiding the aforementioned undesirable issues.

Finally, it may be seen that a single ground wire travels from ground buss (240) of service entrance panel (200), through transfer switches (400, 500), providing a safety ground in the transfer switches (400, 500) and ground to the first and second loads through cables 15 and 14, respectively, to terminate on the ground buss of subpanel (600), from which the inverter (110) picks up a safety ground. Thus, ground loops have also been avoided by the embodiment of the present invention depicted in FIG. 4.

Figure 5:
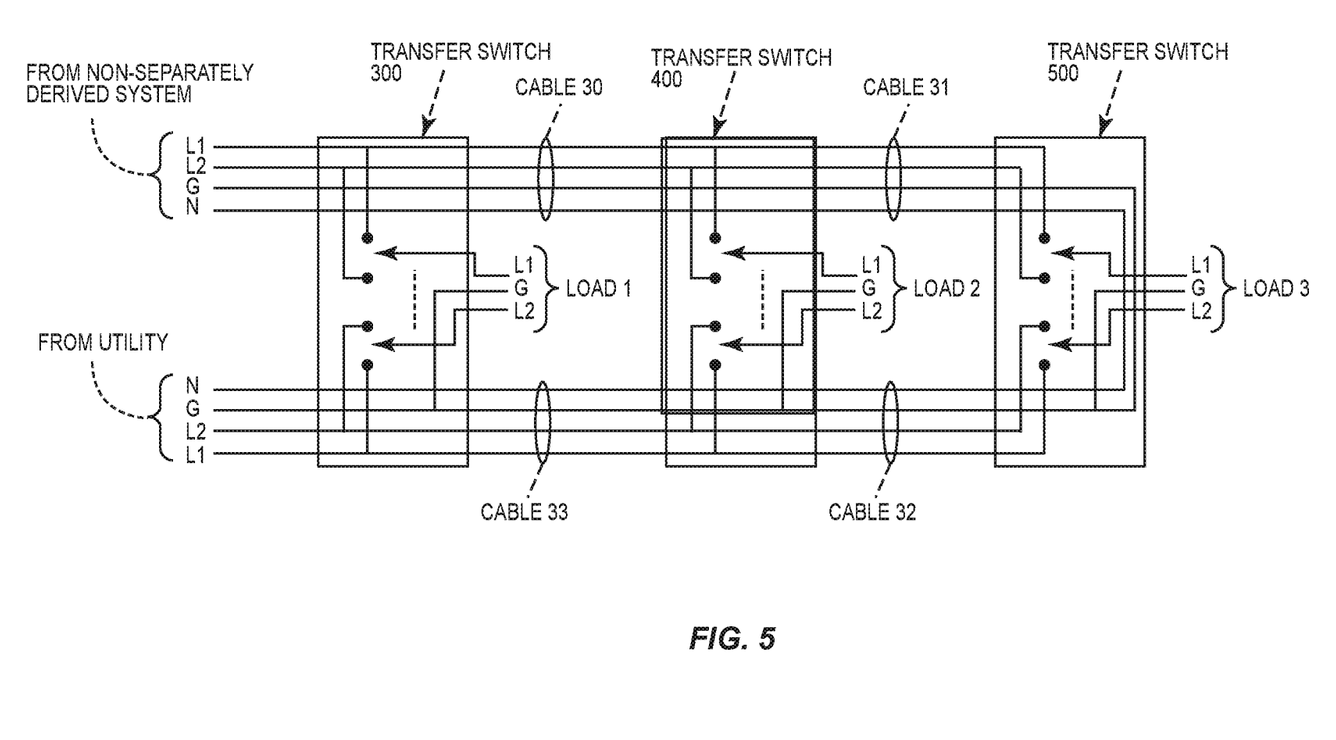
FIG. 5 shows a neutral routing dilemma for multiple transfer switches.

FIG. 5 illustrates the neutral routing dilemma when multiple transfer switches in different locations are able to select power from either a first electrical power source (e.g., utility grid) or a second, non-separately derived power system. By definition, the latter has its neutral connected to the neutral of the first power source, via which it is grounded to a single system ground. The transfer switches are thus configured to select only between the hotlegs of the two systems, and do not select between neutrals.

In FIG. 5, two power sources each provide two hotlegs L1 and L2, a neutral, and a ground to a first transfer switch (300). The transfer switch taps off L1 and L2 from both sources to appropriate contacts of the double-pole, double throw selection switch, and then pass the two L1s and the two L2s out to transfer switch (400). Transfer switch (400) does likewise, and passes the L1s and L2s on further to transfer switch (500). At this point it should be pointed out that the sources probably have the amperage capacity to supply all three loads should all select the same source, and therefore the available current from the sources is likely greater than the ampacity of the cables feeding the loads. Thus, the smaller cables feeding the loads require overcurrent protection from the much higher available current of the sources. NEC paragraph 240.21 B (1) permits the overcurrent protection devices (i.e., circuit breakers) to be located in the output wiring from the transfer switches—provided that they are not more than 3 meters away; that the wires from the transfer switch to the breaker are contained in conduit or other raceway; and that the breaker trip current is less than the ampacity of the wires. Normally the breaker trip current can be one gradation over the ampacity of the wires, but not in the case of taps.

While FIG. 5 looks simple, the routing of a neutral to loads 1, 2, and 3 has not been shown, and therein lies the dilemma. A neutral wire is shown running from the first source, i.e., utility grid, through all three transfer switches and then looping back to join the neutral from the non-separately derived source. The neutral feed to load 3 could permissibly be selected from the neutral within tranasfer switch (500), as whichever soucre were selected by transfer switch (500), the neutral current would return to the selected source via the same cable from which it arrived. However, there is no way to connect to the neutral in transfer switches (300) or (400) that has this property. If the neutral to load 2 is connected to the neutral wire of upper cable sections 30 and 31 as it passes through the switch, but transfer switch (400) selects utility power, and therefore receives current from the L1 and L2 conductors of lower cable sections 32 and 33 as they pass through the switch, then there will be utility neutral current in the neutral wire of cable sections 31 and 32 without a corresponding L1, L2 current to balance it. The converse happens if the neutral to load 2 is connected to the neutral wire of cable sections 32 and 33 as it passes through transfer switch (400), and the transfer switch has selected the non-separately derived source. Thus it is not possible to find a fixed place in transfer switches (300) or (400) from which to tap a neutral for their respective loads.

Figure 6:
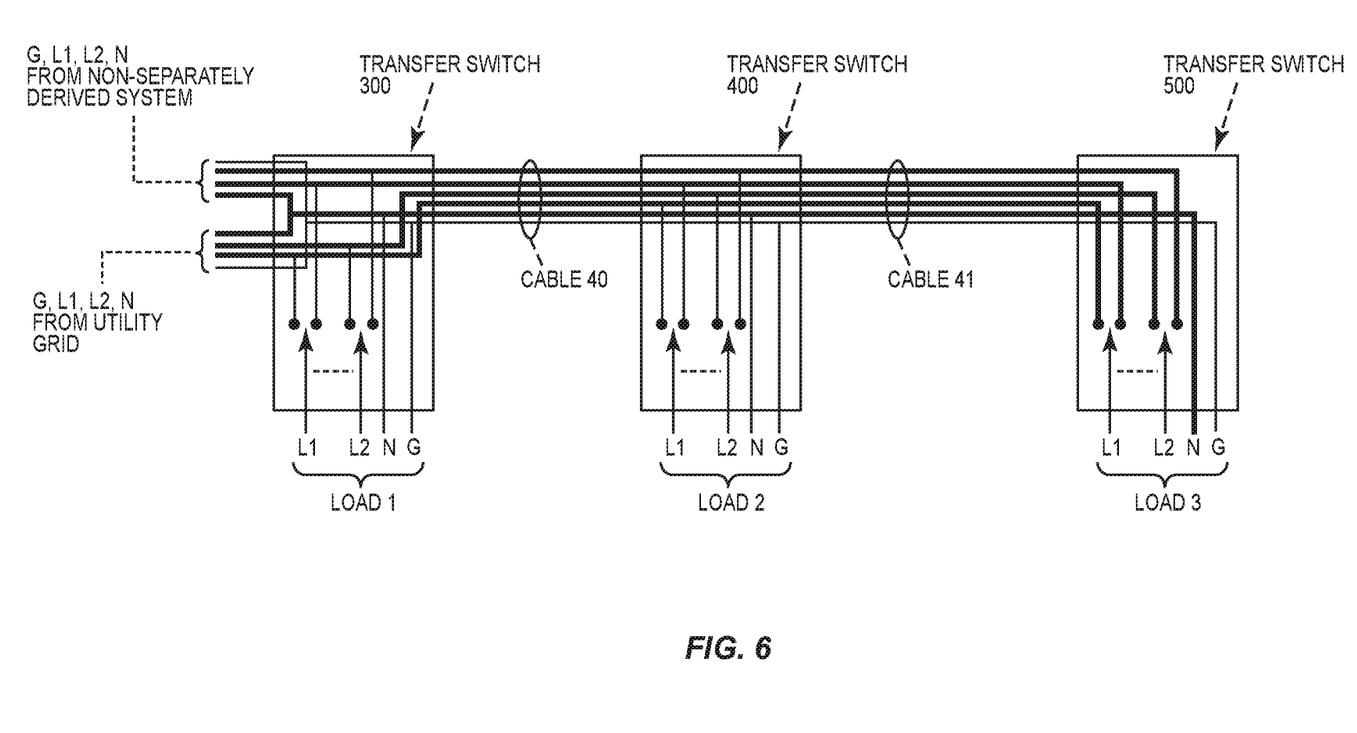
FIG. 6 shows a neutral routing solution for multiple transfer switches according to one embodiment of the invention.

According to one embodiment of the present invention, this problem is solved by combining cable sections 30 and 33 into a single cable or conduit, and doing likewise for cable sections 31 and 32, as shown in FIG. 6. Morover, the two neutrals and the grounds of the combined cable sections can be combined into a single neutral and a single ground.

FIG. 6 shows a neutral routing solution for multiple transfer switches, according to one embodiment of the present invention. In this case, it is assumed that both sources route their L1, L2, neutral, and ground wires through respective cables to the first transfer switch (300) in the chain of transfer switches. The L1, L2, N and G wires of the utility come from a 2-pole breaker in a service entrance panel or subpanel, while the non-separately derived system may be a solar inverter driven by a solar-charged battery, for example. In the first transfer switch (300), the neutral of the utility grid is connected to the neutral of the non-separately derived system, thereby providing the grounding of the latter's neutral back to the system ground at the service entrance panel.

Likewise, the ground from the utility connection is looped back to provide the ground for the non-separately derived system. Transfer switch (300) taps its neutral and ground wires for load 1 directly from the now-commoned neutral and ground inputs.

The L1 and L2 wires from both sources plus the now-common neutral and the ground wire are consolidated into a single cable or conduit for passing on the choice of either source to transfer switches (400, 500) futher down the chain. Cable section 40 passes the 2×L1 plus 2×L2 plus neutral and ground to transfer switch (400). Transfer switch (400) taps off the two L1s and the two L2s to its double pole, double throw selection switch, and taps off neutral and ground for load 2, passing the incoming 2×L1 and 2×L2 plus ground and neutral wires on down to transfer switch (500) which is the last one in the chain in this example. The transfer switches must have proper terminals, lugs, or busbars installed for providing taps to the L1, L2 and common ground wires. In the embodiment depicted in FIG. 6, the current in the neutral wire of any cable section is always guarateed to balance the combined currents of the L1 and L2 wires in the same cable section, thereby avoiding the aforementioned undesirable effects when current balance is not achieved.

In FIG. 6, if one source is connected to transfer switch (500) while the other remains connected to transfer switch (300), the arrangement is similar to that depicted in FIG. 4, in which the common neutral in cable sections 40 and/or 41 may carry the sum of the currents of both sources. However, since cables 40 and 41 are sized to carry the combined current of all loads, whether utility or other source is selected in any combination, their ampacity suffices under all conditions.

Figure 7:
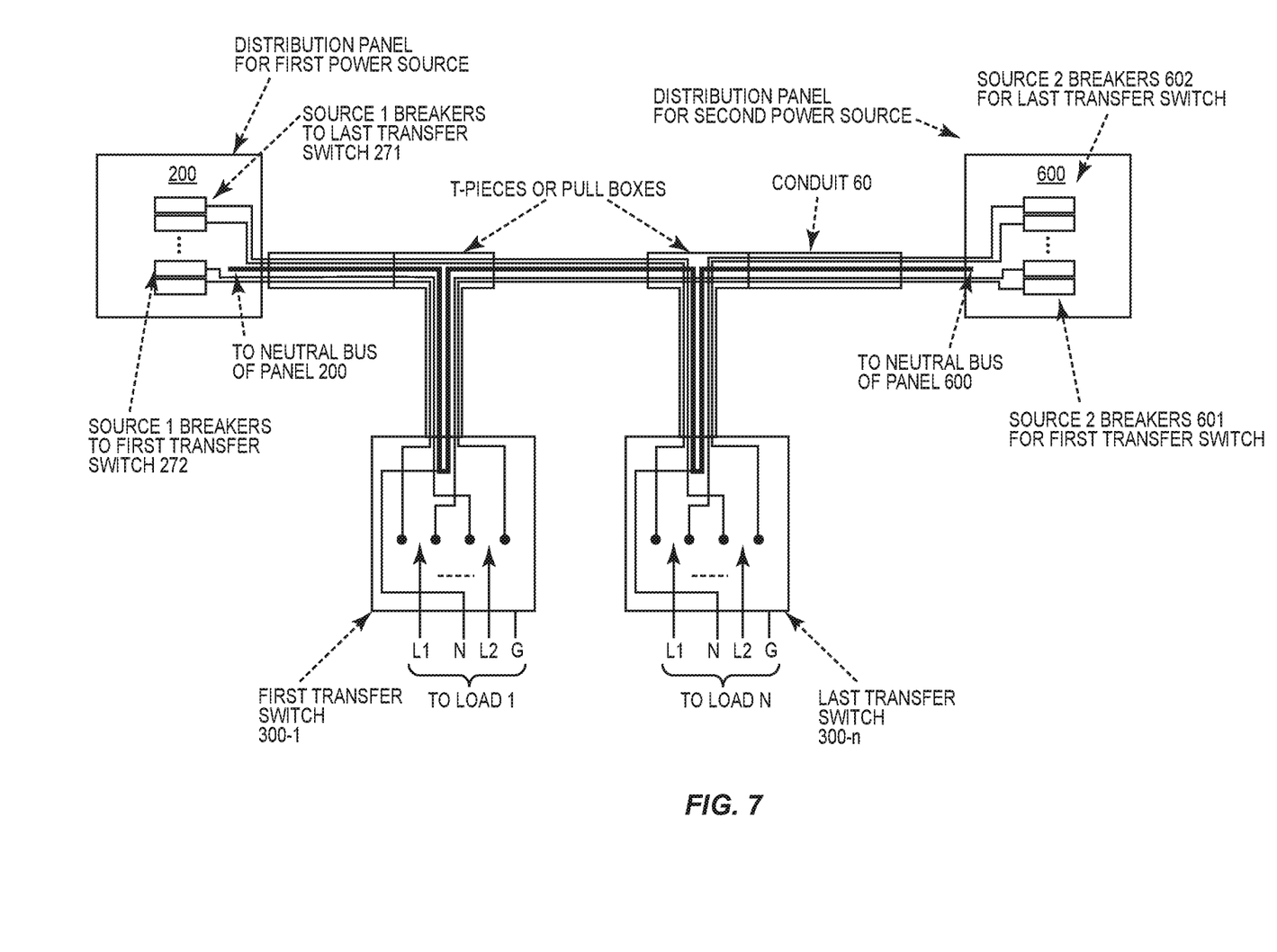
FIG. 7 shows a genralization of the embodiment of FIG. 4 to multiple transfer switches.

FIG. 7 generalizes the embodiment depicted in FIG. 4 to multiple transfer switches.

Referring to FIG. 7, a distribution panel (200) contains breakers for distributing power from a first source, e.g., the utility grid, to transfer switches 300-1 to 300-*n*. The breakers would be single-pole breakers for a single phase supply and the corresponding transfer switches would be single pole transfer switches. The breakers would be 2-pole breakers for a split phase supply and the transfer switches would then be 2-pole transfer switches, as illustrated in FIG. 7. Alternatively, the breakers could be 3-pole breakers for a 3-phase supply and the transfer switches could correspondingly be 3-pole transfer switches. The latter may be used in a commercial installation. Breaker (271) of FIG. 7 supplies power from the first source to the last transfer switch (300-*n*) in the chain. Breaker (272) supplies power from the first source to the first transfer switch (300-1) in the chain. Other breakers, not shown, may supply power to other transfer switches between the first and the last. All the line conductors from all the breakers in panel (200) pass through the same conduit run (60) and drop out via one of the illustrated T-pieces (or pull boxes) to the source 1 terminals of the intended transfer switch, The remainder continue down conduit run 60 until they arrive at their intended transfer switch.

In the reverse direction, panel (600) distributes power from the second source, which may be a communal inverter which is a non-separately derived source. Breaker (601) supplies line to the source 2 terminals of the first transfer switch (300-1) while breaker (602) supplies line to the source 2 terminals of the last transfer switch (300-*n*). Other breakers (not shown) may supply line from source 2 to transfer switches between the first and the last. All such line conductors pass through the same conduit run 60 until they arrive at their intended transfer switch where they drop out through the indicated T-piece or pull box, and those that have not reached their intended transfer switch continue. A benefit of feeding source 2 line conductors into one end of conduit run 60 and source 1 line conductors in to the other end is that the number of wires in the conduit remains constant throughout its length and thus conduit fill and ampacity derating for multiple conductors in a conduit remain uniform.

It is particularly pointed out that in accordance with embodiments of the present invention, a common neutral wire, properly sized to take the sum of all return currents, runs through the conduit 60 to connect the neutral of source 1 to the neutral of source 2, thereby grounding the neutral of source 2 via the source 1's neutral which is grounded back at its service entrance. This makes source 2 a non-separately derived system, allowing transfer switches to be used that do not switch the neutral.

The neutral wire running through conduit run 60 from panel (200) to panel (600) dives down into each transfer switch from the respective T-piece or pull box to provide the neutral for that transfer switch's load, and then runs back up again to continue on to the next T-piece. Since neutral current not flowing in the transfer switch's load flows first down and then back up to the T-piece, it cancels in the conduit between the T-piece and the transfer switch, while neutral current that does flow from the transfer switch's load is balanced by line current that flows to the load in the same piece of conduit. Thus the wiring arrangement of FIG. 7 maintains balance of all currents within all sections of conduit, as required. The ground wire is not shown for clarity. The NEC allows metal conduit to provide a ground; however, because conduit junctions can become loose, it is generally advisable to run a separate grounding wire the whole length of the conduit. This would dive down from a T-piece to and back up again from the respective transfer switch in the same way as the common neutral conductor, to provide an equipment ground for the transfer switch as well as a safety ground for the loads. The ground wire would connect the ground buss of panel (600) to the ground buss of panel (200), which connects to the ground system for the entire installation. It would be permitted to have multiple grounding rods in different places, for example near panel (600) as well as panel (200), as long as they were bonded via the common grounding conductor.

Figure 8:
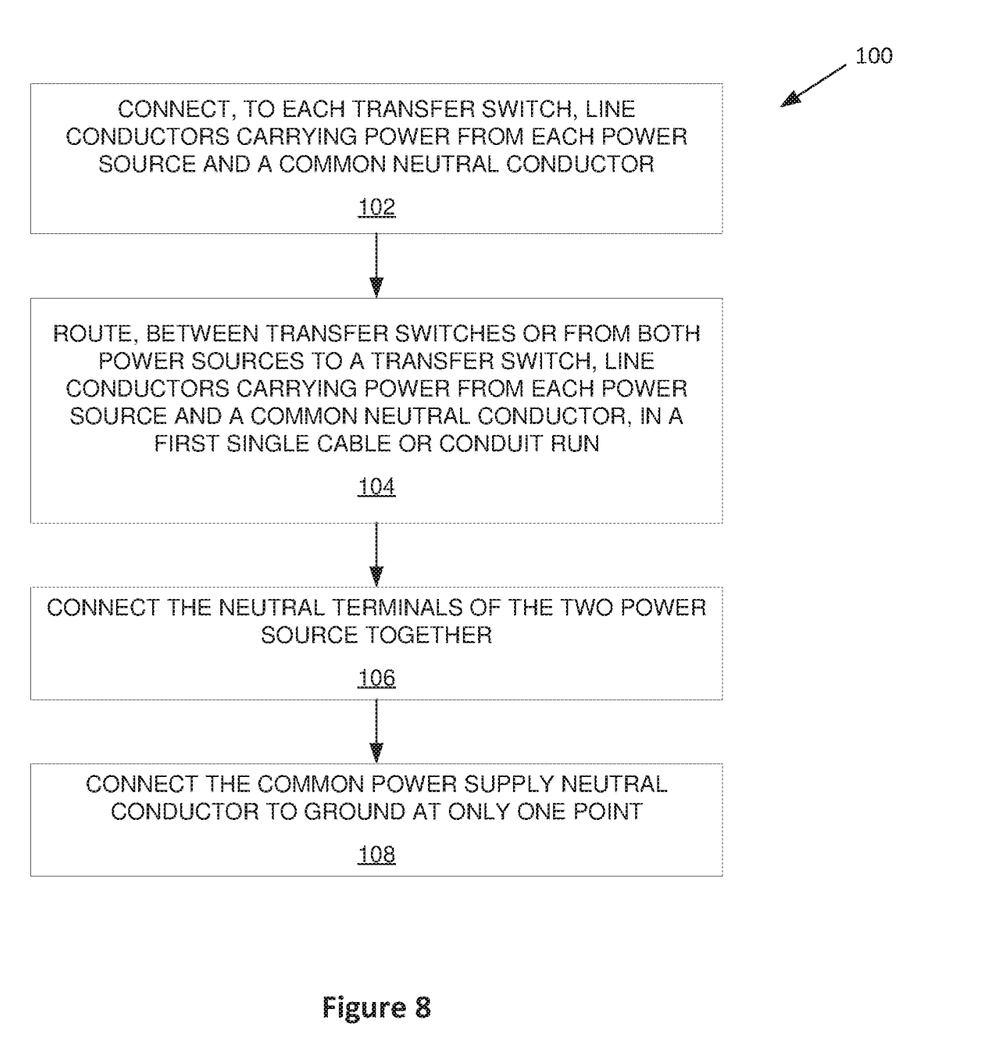
FIG. 8 is a flow diagram of a method of wiring a facility for the distribution of electric power from two power sources.

FIG. 8 depicts the steps of a method 100 of wiring a facility, such as a residence, for the distribution of electric power from two power sources to one or more transfer switches. Each transfer switch is operative to individually select power for connected loads from either power source, in a manner that avoids ground currents in neutral wiring conductors. Line conductors carrying power from each power source, and a common neutral conductor, are connected to each transfer switch (block 102). Line conductors carrying power from each power source, and a common neutral conductor, are routed, between transfer switches or from both power sources to a transfer switch, in a first single cable or conduit run (block 104). The neutral terminals of the two power sources are connected together (block 106). The common power supply neutral conductor is connected to ground at only one point (block 108).

U.S. Pat. No. 8,937,822, titled "Solar energy conversion and utilization system," issued to Applicant on Jan. 20, 2015, the disclosure of which is incorporated herein by reference in its entirety, describes among other things a new type of subpanel that has inputs for two independent split-phase sources and comprises independent, automatic transfer switches for each breaker circuit contained therein. Moreover, the transfer switches are upstream of the breaker of the circuit for which they select power, so only one set of breakers is required instead of a set for source 1 and a set for source 2, as shown in FIG. 7. One of the sources is typically envisaged to be the electric utility grid while the second source is typically envisaged to be a solar-charged battery-inverter system. The automatic transfer switches are controlled to independently select each circuit to be powered from either utility power or solar-derived power in order to maximize self-consumption of own free solar power in preference to expensive utility power when both are available. Alternatively, they may select solar-derived power for as many circuits as possible when the utility is in outage or is in a high tariff period. A microprocessor is provided with all information pertinent to the choice, including, e.g.: utility power input status, battery charge state, amount of incoming solar power, time of day, preprogammed user priorities, utility tariff versus time of day and/or total load, load characteristics, learned statistical consumption patterns, actual load currents, user overrides, and weather patterns and data from neighboring systems' peformance collected, aggregated, digested and distributed by a server to warn for example of neighboring weather conditions imminently arriving. The microprocessor processes all such information using multiple algorithms to determine the source selection for each circuit, in order to optimize criteria important to the homeowner.

A solar system may be envisaged in which two or more of the above new and inventive type of subpanels are installed in the same location, powered by the same inverter. The embodiments of the neutral routing arrangements depicted in FIG. 4 or 6 herein are appropriate for use in such an installation.

A multifamily dwelling structure may comprise one of the '822 patent subpanels per dwelling connected to a communal solar-charged battery and inverter system. The embodiments depicted in FIG. 6 or 7 described herein may then be used to connect the communal inverter system to multiple subpanels, without violating Code or creating neutral or ground loops.

Although embodiments of the present invention have been described herein primarily with reference to residential installations, the invention is not so limited. In general, embodiments of the present invention may be advantageously deployed in any facility wherein electrical power is distributed from two (or more) power sources to one or more transfer switches operative to select between the power sources for one or more loads.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An electrical power distribution wiring arrangement for a facility, characterized by:
   a first power source distribution panel comprising at least one line terminal and at least one neutral terminal connectable to a first power source and at least one output line terminal and an output neutral terminal, the panel connecting the neutral terminals to a ground bus connected to a grounding system at or near the first power source distribution panel;
   a second, non-separately derived system power source operative to output electrical power on at least one line terminal and a neutral terminal;
   a first transfer switch operative to select the first power source or the second power source to power one or more electrical loads and having a single neutral connection; and
   a first cable or conduit run connected to the transfer switch, and containing
      a first set of at least one line conductors operative to carry load current from the first power source to the load;
      a second set of at least one line conductors operative to carry load current from the second power source to the load; and
      a common neutral conductor operative to carry return current from either the first or second set of line conductors;
   wherein the neutral terminal of the second power source is connected to the neutral terminal of the first power source distribution panel, in part via the common neutral conductor of the first cable or conduit run, and hence to the grounding system at or near the first power source distribution panel.

2. The wiring arrangement of claim 1 wherein the first cable or conduit run connects to the first power source distribution panel and to the second power source, and further comprising a second transfer switch operative to select the first power source or the second power source to power one or more electrical loads and having a single neutral connection, and wherein, for each of the first and second transfer switches:
   line conductors from the first set, line conductors from the second set, and the common neutral conductor are tapped at the same interval along the length of the first cable or conduit run, proximate to the respective transfer switch, to provide the switch with selectable power from the first power source distribution panel and the second power source, and with a common neutral conductor.

3. The wiring arrangement of claim 1 wherein:
   the second power source is a DC-to-AC inverter-charger comprising
      a charging line input;
      a set of at least one first power source line inputs, each first power source line input passing through to a corresponding first power source line output;
      a neutral input passing through to a corresponding neutral output connected to the second power source neutral output; and
      a set of at least one second power source line outputs; and
   the first cable or conduit run is connected between the second power source and the first transfer switch;
   and further characterized by
      a second cable or conduit run connected between the first power source distribution panel and the second power source, the second cable or conduit run comprising
         a first set of at least one line conductors operative to carry charging current from a first circuit breaker in the first power source distribution panel to the second power source;
         a second set of at least one line conductors operative to carry load current from a second circuit breaker in the first power source distribution panel to and through the second power source to the transfer switch; and
         a neutral conductor operative to carry return current from the second set of line conductors or the second power source line outputs.

4. The wiring arrangement of claim 3 wherein:
   the first and second cables or conduit runs further comprise a common ground conductor operative to provide equipment and safety grounds;
   the second power supply further comprises a ground input passing through to a corresponding ground output connected to the second power source ground; and
   the first transfer switch includes a ground connection;
   whereby loads connected to the first transfer switch, and the second power supply, connect to the ground bus in the first power source distribution panel.

5. The wiring arrangement of claim 3 wherein the second set of at least one line conductors in the second cable or conduit run comprises an L1 line conductor and an antiphase L2 line conductor of a split phase power supply, and wherein the second circuit breaker in the first power source distribution panel is a 2-pole circuit breaker.

6. The wiring arrangement of claim 5 wherein:
   the first set of at least one line conductors in the first cable or conduit run comprises an L1 line conductor and an antiphase L2 line conductor of a split phase power supply from the first power source;
   the second set of at least one line conductors in the first cable or conduit run comprises an L1 line conductor and an antiphase L2' line conductor of a split phase power supply from the second power source; and
   the first transfer switch is a 2-pole transfer switch.

7. The wiring arrangement of claim 3 wherein the second set of at least one line conductor in the cable or conduit run comprises L1, L2, and L3 line conductors of a three-phase supply, and wherein the second circuit breaker in the first power source distribution panel is a 3-pole circuit breaker.

8. The wiring arrangement of claim 7 wherein:
the first set of at least one line conductors in the first cable or conduit run comprises L1, L2, and L3 line conductors of a three-phase supply from the first power source;
the second set of at least one line conductors in the first cable or conduit run comprises L1', L2', and L3' line conductors of a three-phase supply from the second power source; and
the first transfer switch is a 3-pole transfer switch.

9. The wiring arrangement of claim 1 wherein the first cable or conduit run connects the first transfer switch to a second transfer switch operative to select the first power source or the second power source to power one or more electrical loads and having a single neutral connection, and further characterized by:
a second cable or conduit run connected between the first power source distribution panel and the first transfer switch, the second cable or conduit run comprising
a first set of at least one line conductors operative to carry load current from a first circuit breaker in the first power source distribution panel to the first transfer switch;
a second set of at least one line conductors operative to carry load current from a second circuit breaker in the first power source distribution panel to the second transfer switch; and
a neutral conductor operative to carry return current from the first and second transfer switches; and
a third cable or conduit run connected between the second power source and the second transfer switch, the third cable or conduit run comprising
a first set of at least one line conductors operative to carry load current from the second power source to the second transfer switch;
a second set of at least one line conductors operative to carry load current from the second power source to the first transfer switch; and
a neutral conductor operative to carry return current from the first and second transfer switches and to connect the second power supply neutral terminal.

10. The wiring arrangement of claim 9 wherein the first power source is an electric utility grid.

11. The wiring arrangement of claim 9 wherein the second, non-separately-derived power source is a solar-charged battery-inverter system.

12. The wiring arrangement of claim 9 wherein:
the first and second power sources are split-phase sources;
the first and second circuit breakers in the first power source distribution panel are 2-pole breakers;
the first and second transfer switches are 2-pole transfer switches; and
first and second sets of at least one line conductors in each of the first, second, and third cables or conduit runs comprise at least two wires.

13. The wiring arrangement of claim 9 wherein:
the first and second power sources are 3-phase sources;
the first and second circuit breakers in the first power source distribution panel are 3-pole breakers;
the first and second transfer switches are 3-pole transfer switches; and
first and second sets of at least one line conductors in each of the first, second, and third cables or conduit runs comprise at least three wires.

14. The wiring arrangement of claim 9 wherein each transfer switch connects to respective cables or conduit runs at an associated T-piece or pull-box, each of which also connect one cable or conduit run to another.

15. The wiring arrangement of claim 14 wherein, at each T-piece or pull-box, the common neutral conductor from one cable or conduit run exits the T-piece or pull-box, electrically connects to a neutral terminal of the associated transfer switch, returns to the T-piece or pull-box, and electrically connects to the common neutral conductor of the other cable or conduit run.

16. A method of wiring a facility for the distribution of electric power from two power sources to one or more transfer switches operative to individually select power for connected loads from either power source, in a manner that avoids part of the neutral return current flowing in ground conductors, characterized by:
connecting, to each transfer switch, line conductors carrying power from each power source and a common neutral conductor;
routing, between transfer switches or from both power sources to a transfer switch, line conductors carrying power from each power source and a common neutral conductor, in a first single cable or conduit run;
connecting the neutral terminals of the two power sources together; and
connecting the common power supply neutral conductor to ground at only one point.

17. The method of claim 16 wherein a first power source is an electrical utility grid and a second power source is an inverter-charger system, further characterized by:
routing, in a second single cable or conduit run from a first power source distribution panel connected to the grid to the inverter-charger system, a first set of at least one line conductors carrying charging power, and a second set of at least one line conductors carrying grid power to drive one or more loads connected to the transfer switch;
terminating the first set of at least one line conductors at the inverter-charger system;
passing the second set of at least one line conductors through the inverter-charger system;
routing, in the first single cable or conduit run from the inverter-charger system to the transfer switch, the second set of at least one line conductors and a third set of at least one line conductors carrying inverter power to drive one or more loads connected to the transfer switch; and
routing, in both the first and second cables or conduit runs a common neutral conductor from the first power source distribution panel, to and through the inverter-charger system, and to the transfer switch; and
grounding the neutral conductor only at or near the first power source distribution panel.

18. The method of claim 17 wherein the second and third sets of at least one line conductors each comprises an L1 line conductor and an antiphase L2 line conductor of a split phase power supply, and wherein the transfer switch is a 2-pole transfer switch.

19. The method of claim 17 wherein the second and third sets of at least one line conductors each comprise L1, L2, and L3 line conductors of a three-phase supply, and wherein the transfer switch is a 3-pole transfer switch.

20. The method of claim 16 wherein each of first and second power sources provide power to each transfer switch on a dedicated set of at least one line conductors and wherein the first single cable or conduit run extends between first and second transfer switches, further characterized by:
routing a second cable or conduit run between the first power source and the first transfer switch, the second cable or conduit run comprising
a first set of at least one line conductors operative to carry load current from the first power source to the first transfer switch;
a second set of at least one line conductors operative to carry load current from the first power source to the second transfer switch; and
a neutral conductor operative to carry return current from the first and second transfer switches; and
routing a third cable or conduit run connected between the second power source and the second transfer switch, the third cable or conduit run comprising
a first set of at least one line conductors operative to carry load current from the second power source to the second transfer switch;
a second set of at least one line conductors operative to carry load current from the second power source to the first transfer switch; and
a neutral conductor operative to carry return current from the first and second transfer switches and to connect the second power supply neutral terminal.

21. The method of claim 20 wherein:
the first and second power sources are split-phase sources;
the first and second transfer switches are 2-pole transfer switches; and
first and second sets of at least one line conductors in each of the first, second, and third cables or conduit runs comprise at least two wires.

22. The method of claim 20 wherein:
the first and second power sources are 3-phase sources;
the first and second transfer switches are 3-pole transfer switches; and
first and second sets of at least one line conductors in each of the first, second, and third cables or conduit runs comprise at least three wires.

23. The method of claim 20 wherein further characterized by connecting each transfer switch to respective cables or conduit runs at an associated T-piece or pull-box, each of which also connect one cable or conduit run to another.

24. The method of claim 23 further characterized by, at each T-piece or pull-box, routing the common neutral conductor from one cable or conduit run out of the T-piece or pull-box, electrically connecting it to a neutral terminal of the associated transfer switch, returning it to the T-piece or pull-box, and electrically connecting it to the common neutral conductor of the other cable or conduit run.

* * * * *